(12) United States Patent
Hua et al.

(10) Patent No.: US 8,549,340 B2
(45) Date of Patent: Oct. 1, 2013

(54) POWER LINE COMMUNICATION APPARATUS AND METHOD FOR CONTROLLING THE SAME

(75) Inventors: Jin Hua, Shenzhen (CN); Xujun Wang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 100 days.

(21) Appl. No.: 12/858,141

(22) Filed: Aug. 17, 2010

(65) Prior Publication Data
US 2010/0313051 A1 Dec. 9, 2010

Related U.S. Application Data

(63) Continuation of application No. PCT/CN2009/072855, filed on Jul. 21, 2009.

(30) Foreign Application Priority Data

Dec. 10, 2008 (CN) .......................... 2008 1 0239342

(51) Int. Cl.
*G06F 1/00* (2006.01)
*G06F 1/32* (2006.01)

(52) U.S. Cl.
USPC .......................................... 713/324; 713/320

(58) Field of Classification Search
USPC ......... 713/300, 320, 322–324, 340; 710/305; 709/250
See application file for complete search history.

(56) References Cited

U.S. PATENT DOCUMENTS

| 5,914,538 | A  | * | 6/1999 | Kurosawa et al. | 307/18 |
| 7,986,219 | B2 | * | 7/2011 | Matsuoka | 340/12.32 |
| 2005/0181839 | A1 | * | 8/2005 | Tiainen et al. | 455/573 |
| 2006/0010331 | A1 |   | 1/2006 | Ohara | |

(Continued)

FOREIGN PATENT DOCUMENTS

| CN | 2449278 Y | 9/2001 |
| CN | 1719384 A | 1/2006 |

(Continued)

OTHER PUBLICATIONS

Enders, T. et al. "Automotive Powerline Communications—a new physical layer for CAN". 2003 International CAN Conference. pp. 1-11.*

(Continued)

*Primary Examiner* — Thomas J Cleary
(74) *Attorney, Agent, or Firm* — Brinks Hofer Gilson & Lione (57) ABSTRACT

The embodiments of the present disclosure provide a PLC apparatus and a method for controlling the PLC apparatus. The method includes: acquiring a working state and a network state of the PLC apparatus; and switching the working state of the PLC apparatus in accordance with the working state and the network state of the PLC apparatus. The PLC apparatus includes: a working state acquiring unit adapted to acquire a working state of the PLC apparatus; a network state acquiring unit adapted to acquire a network state of the PLC apparatus; a switching unit adapted to switch the working state of the PLC apparatus in accordance with the network state of the PLC apparatus acquired by the network state acquiring unit and the working state of the PLC apparatus acquired by the working state acquiring unit. The embodiments of the disclosure are used in the design of controlling the PLC apparatus.

6 Claims, 4 Drawing Sheets

(56) References Cited

U.S. PATENT DOCUMENTS

| | | | |
|---|---|---|---|
| 2007/0079151 A1* | 4/2007 | Connor et al. | 713/300 |
| 2007/0293953 A1* | 12/2007 | Hoshi | 700/12 |
| 2008/0024106 A1* | 1/2008 | Landry et al. | 323/316 |
| 2009/0096592 A1* | 4/2009 | Wu et al. | 340/310.12 |
| 2010/0171602 A1* | 7/2010 | Kabbara et al. | 340/333 |
| 2011/0204726 A1* | 8/2011 | Ito | 307/117 |

FOREIGN PATENT DOCUMENTS

| | | |
|---|---|---|
| EP | 1 122 712 A1 | 8/2001 |
| EP | 1 868 299 A2 | 12/2007 |
| JP | 8-336080 | 12/1996 |
| KR | 10-2007-0069241 | 7/2007 |
| KR | 10-2008-0056526 | 6/2008 |
| WO | 2008/081668 A1 | 7/2008 |
| WO | WO 2008102496 A1 * | 8/2008 |

OTHER PUBLICATIONS

International Search Report issued in corresponding PCT Application No. PCT/CN2009/072855; mailed Sep. 17, 2009.

European Search Report issued in corresponding European Patent Application No. 09 17 7651; issued Mar. 23, 2010.

Office Action issued in corresponding Chinese Patent Application No. 200810239342.3, mailed Jul. 4, 2012.

Office Action issued in corresponding Chinese Patent Application No. 200810239342.3, mailed Apr. 27, 2013, 5 pages.

\* cited by examiner

POWER LINE COMMUNICATION APPARATUS AND METHOD FOR CONTROLLING THE SAME

CROSS-REFERENCE TO RELATED APPLICATIONS

This patent document is a continuation of International Application No. PCT/CN2009/072855, filed on Jul. 21, 2009, which claims priority to Chinese Patent Application No. 200810239342.3, filed on Dec. 10, 2008, both of which are hereby incorporated by reference in their entireties.

FIELD OF TECHNOLOGY

The present disclosure relates to the field of communication, and particularly to a Power Line Communication (PLC) apparatus and a method for controlling the PLC apparatus.

BACKGROUND OF THE DISCLOSURE

As a new technique for household networking, the technique of power line data transmission has been gradually applied. Through a Power Line Communication (PLC) apparatus, terminals such as computers can transmit data to each other by means of power lines.

During the implementation of the present disclosure, the inventor finds that the existing technology has at least the following problems.

When the PLC apparatus is working, the power source of the PLC apparatus converts the Alternating Current (AC) utility power (100~240 V AC) into the working voltage required by the PLC apparatus. The useful power of the power conversion is relatively low, and up to 75%. Home users usually need not to continuously use the PLC apparatus all day long, but even if the PLC apparatus is not used, the power source will continuously convert the AC utility power in case that the power source of the PLC apparatus is not turned off, and thus the electric energy is wasted. In addition, power consumption of the power source of the PLC apparatus is high, and much heat is generated, so the working state of the PLC apparatus is unstable due to the excessively high temperature.

In addition, the PLC apparatus has various chips therein, such as a power source chip that provides power conversion of the AC utility power (100~240 V AC) to ensure electric supply for the PLC apparatus during working; a network transmission chip that carries out Ethernet line signal input/output and modulation/demodulation to ensure transmission of network signal over the line. When the user does not use the PLC apparatus, if the power source thereof is not turned off and the chips therein are still in the maximum power consumption mode, the electric energy will also be wasted.

In order to save the electric energy, when not being used by the user, the PLC apparatus shall be manually powered off, or even pulled off. When the PLC apparatus is to be used at a next time, it shall be manually powered on.

SUMMARY OF THE DISCLOSURE

The technical problem to be solved by the present disclosure is to provide a Power Line Communication (PLC) apparatus and a method for controlling the PLC apparatus, which enables the PLC apparatus to save electric energy automatically.

In order to solve the above technical problem, embodiments of the present disclosure provide the following technical solutions.

An embodiment of the present disclosure provides a method for controlling a PLC apparatus, including: acquiring a working state and a network state of the PLC apparatus; and switching the working state of the PLC apparatus in accordance with the working state and the network state of the PLC apparatus.

Another embodiment of the present disclosure provides a PLC apparatus, including a working state acquiring unit, adapted to acquire a working state of the PLC apparatus; a network state acquiring unit, adapted to acquire a network state of the PLC apparatus; and a switching unit, adapted to switch the working state of the PLC apparatus in accordance with the network state of the PLC apparatus acquired by the network state acquiring unit and the working state of the PLC apparatus acquired by the working state acquiring unit.

The embodiments of the present disclosure have the following beneficial effects:

In the above solutions, the working state of the PLC apparatus is automatically switched in accordance with the network state and the working state of the PLC apparatus, so that power consumption of the PLC apparatus can be reduced without manual intervention, and an unstable working state of the PLC apparatus due to an excessively high temperature can be avoided.

BRIEF DESCRIPTION OF THE DRAWINGS

In order to describe the technical solutions in the embodiments of the present disclosure or the existing technology more clearly, drawings required to describe the embodiments or the existing technology are briefly introduced as follows. Obviously, the drawings described as follows are just some examples of the present disclosure, and a person skilled in the art can obtain other drawings in accordance with these drawings, without paying any creative effort.

DETAILED DESCRIPTION OF THE EMBODIMENTS

The present disclosure is described in detail as follows in conjunction with the drawings and the embodiments, so that a person skilled in the art can understand the present disclosure better. Obviously, the described embodiments are just a part of the embodiments of the present disclosure, instead of all the embodiments. Any other embodiment obtained by a person skilled in the art based on the embodiments described in the present disclosure without paying creative efforts also falls within the protection scope of the present disclosure.

In order to more clearly present the technical problems to be solved by the present disclosure, and the technical solutions and advantages thereof, the following descriptions are given in conjunction with some embodiments and the accompanying drawings.

Figure 1:
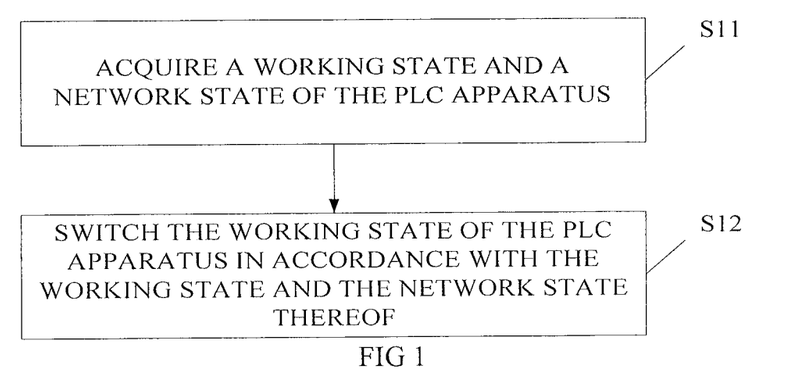
FIG. 1 is a flow diagram of a method for controlling a Power Line Communication (PLC) apparatus according to a first embodiment of the present disclosure.

FIG. 1 illustrates a method for controlling a Power Line Communication (PLC) apparatus according to a first embodiment of the present disclosure. The method is described as follows.

In step S11, the working state and the network state of the PLC apparatus is acquired.

In step S12, the working state of the PLC apparatus is switched in accordance with the working state and the network state of the PLC apparatus.

With the above solution, the working state of the PLC apparatus is automatically switched in accordance with the working state and the network state of the PLC apparatus. Thus, under the condition without manual intervention, the power consumption of the PLC apparatus can be reduced, and an unstable working state of the PLC apparatus due to an excessively high temperature can be avoided.

Figure 2:
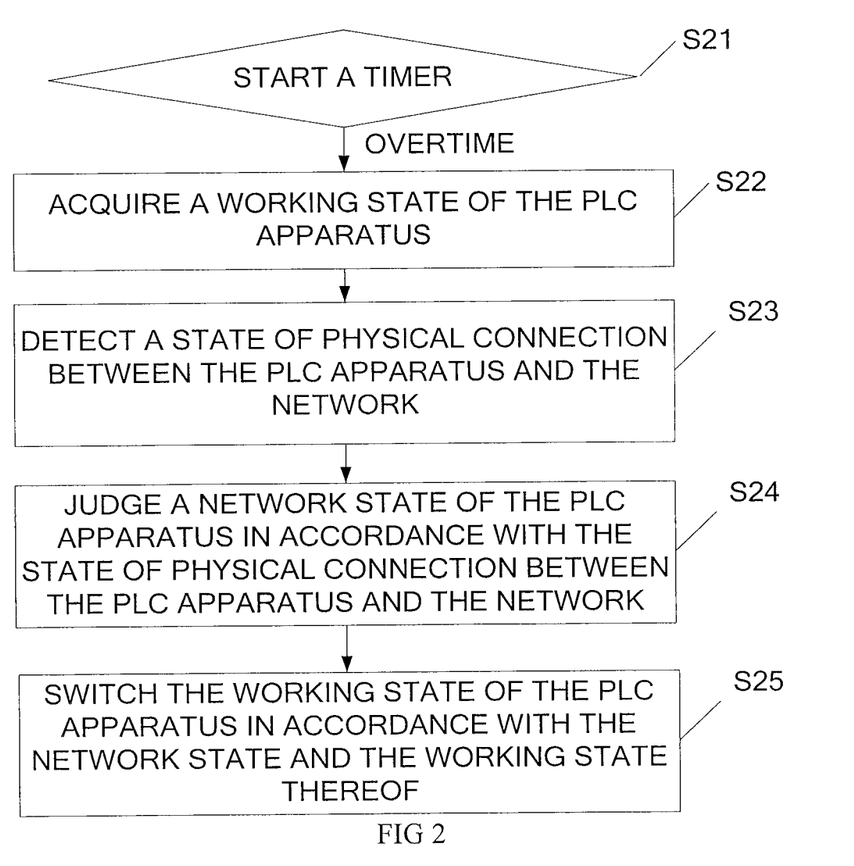
FIG. 2 is a flow diagram of a method for controlling a PLC apparatus according to a second embodiment of the present disclosure.

FIG. 2 illustrates a method for controlling a PLC apparatus according to a second embodiment of the present disclosure. The method is described as follows.

In step S21, a timer is started. The process proceeds to a next step when the timer times out.

In this step, the timer is capable of periodically generating a control signal to periodically detect the network state and the working state of the PLC apparatus, so as to flexibly set a frequency for judging whether or not to switch the working state of the PLC apparatus, and to reasonably configure the system resources occupied by the judging process.

In step S22, the working state of the PLC apparatus is acquired.

In this step, the working state of the PLC apparatus after a previous switching can be recorded in a memory, and the current working state of the PLC apparatus can be acquired by reading the record in the memory.

In step S23, a state of physical connection between the PLC apparatus and the network is detected.

In step S24, the network state of the PLC apparatus is judged in accordance with the state of physical connection between the PLC apparatus and the network.

When the state of physical connection between the PLC apparatus and the network is normal, the acquired network state of the PLC apparatus is "busy"; and when the state of physical connection between the PLC apparatus and the network is disconnected, the acquired network state of the PLC apparatus is "idle".

In step S25, the working state of the PLC apparatus is switched in accordance with the network state and the working state of the PLC apparatus.

The step is performed by switching the PLC apparatus from the normal working state to a sleep state when the network state of the PLC apparatus is idle and the working state is normal, and switching the PLC apparatus from the sleep state to the normal working state when the network state of the PLC apparatus is busy and the working state is sleep.

The normal working state of the PLC apparatus is that the PLC apparatus is powered by its main power source, which charges a battery of the PLC apparatus at the same time. The sleep state of the PLC apparatus is that the PLC apparatus is powered by its battery. In this case, when the PLC apparatus enters the normal working state from the sleep state, the main power source of the PLC apparatus charges the battery; when the PLC apparatus enters the sleep state from the normal working state, the battery firstly starts to supply power, and then a relay shuts off the main power source; and when the PLC apparatus enters the normal working state from the sleep state again, the relay switches to the main power source of the PLC apparatus, and at the same time, the battery is again being charged. Thus, when the PLC apparatus enters the sleep state, the main power source needs not to convert the AC utility power, and power is supplied by the battery, so that the effective power of the PLC apparatus is improved and the electric energy is saved. In addition, the heat generated by the PLC apparatus is reduced, and the reliability of the PLC apparatus is improved. The relay of the PLC apparatus can be controlled to switch between the main power source and the battery by being provided a control signal.

Alternatively, the normal working state of the PLC apparatus is that a chip of the PLC apparatus is in a maximum power consumption mode. The sleep state of the PLC apparatus is that the chip of the PLC apparatus is in a standby mode. In that case, when the PLC apparatus automatically switches to the sleep mode, the chip of the PLC apparatus is in the standby mode, the power consumption is low, and the electric energy is saved. The chip of the PLC apparatus may be a power source chip in the PLC apparatus, or a network transmission chip. The chip of the PLC apparatus can be controlled to switch between the standby mode and the maximum power consumption mode, by being provided with a control signal.

Alternatively, the normal working state of the PLC apparatus is that the PLC apparatus is powered by its main power source, which charges a battery of the PLC apparatus at the same time, and the chip of the PLC apparatus is in a maximum power consumption mode. The sleep state of the PLC apparatus is that the PLC apparatus is powered by its battery and the chip of the PLC apparatus is in a standby mode. The chip of the PLC apparatus may be a power source chip in the PLC apparatus, or a network transmission chip. In this case, when the PLC apparatus automatically switches to the sleep mode, the power consumption of the PLC apparatus is the minimum, and the electric energy is saved at maximum.

In the above embodiment, the network state of the PLC apparatus is firstly judged in accordance with the state of physical connection between the PLC apparatus and the network, and then the working state of the PLC apparatus is automatically switched in accordance with the network state and the working state of the PLC apparatus, so that the PLC apparatus is put into the sleep state when the network state of the PLC apparatus is idle, and the PLC apparatus is put into the normal working state when the network state of the PLC apparatus is busy, thereby saving electric energy without any manual interference.

Figure 3:
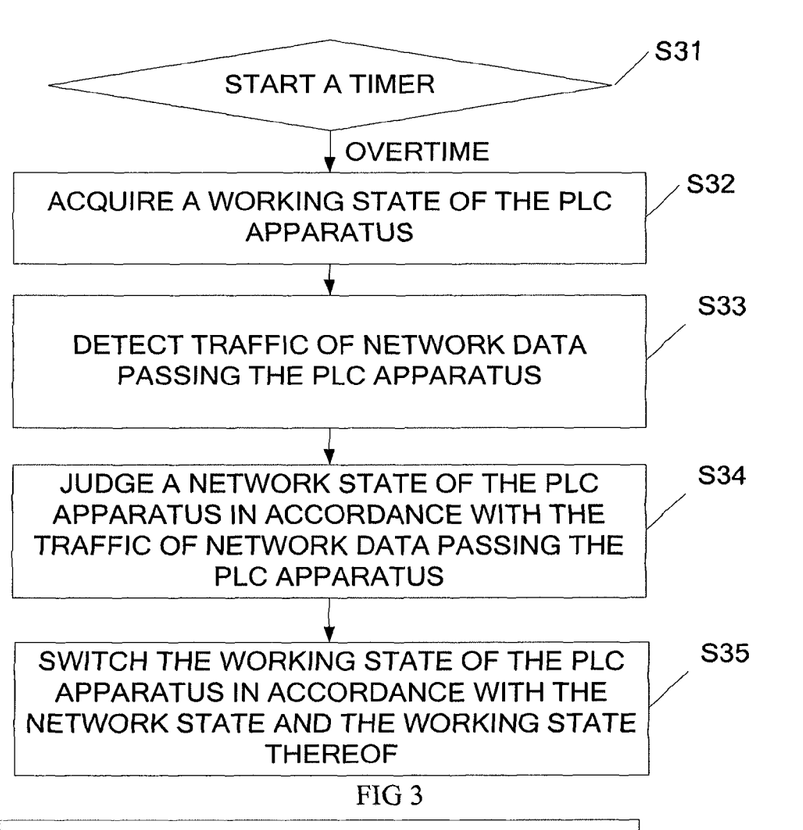
FIG. 3 is a flow diagram of a method for controlling a PLC apparatus according to a third embodiment of the present disclosure.

FIG. 3 illustrates a method for controlling a PLC apparatus according to a third embodiment of the present disclosure. The method is described as follows.

In step S31, a timer is started, and the process proceeds to a next step when the timer times out.

In step S32, a working state of the PLC apparatus is acquired.

In step S33, a traffic of network data passing the PLC apparatus is detected.

In step S34, a network state of the PLC apparatus is judged in accordance with the traffic of network data passing the PLC apparatus.

When the traffic of network data passing the PLC apparatus is higher than a predetermined value, the network state of the PLC apparatus is judged to be busy; and when the traffic of network data passing the PLC apparatus is lower than or equal to the predetermined value, the network state of the PLC apparatus is judged to be idle. The predetermined value can be set as several data packets, or 0 data packet.

In step S35, the working state of the PLC apparatus is switched in accordance with the network state and the working state of the PLC apparatus.

The step is performed by switching the PLC apparatus from the normal working state to a sleep state when the network state of the PLC apparatus is idle and the working state is normal, and switching the PLC apparatus from the sleep state to the normal working state when the network state of the PLC apparatus is busy and the working state is sleep.

The normal working state of the PLC apparatus is that the PLC apparatus is powered by its main power source, which charges a battery of the PLC apparatus at the same time and/or that a chip of the PLC apparatus is in a maximum power consumption mode. The sleep state of the PLC apparatus is that the PLC apparatus is powered by its battery and/or that the chip of the PLC apparatus is in a standby mode.

According to the method for controlling PLC apparatus in accordance with the embodiment of the present disclosure, the network state of the PLC apparatus is firstly judged in accordance with the traffic of network data passing the PLC apparatus, and then the working state of the PLC apparatus is automatically switched in accordance with the network state and the working state of the PLC apparatus, so that the PLC apparatus is put into the sleep state when the network state of the PLC apparatus is idle, and the PLC apparatus is put into the normal working state when the network state of the PLC apparatus is busy, thereby saving electric energy without any manual interference.

Figure 4:
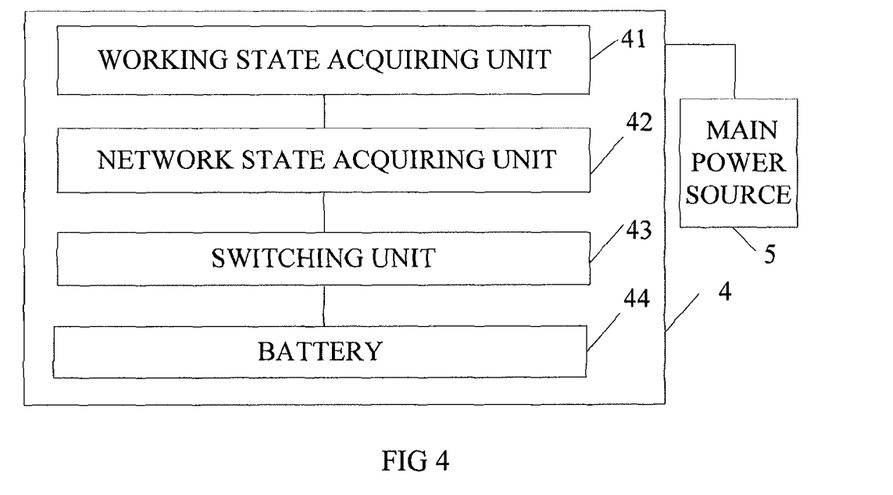
FIG. 4 is a structural diagram of a PLC apparatus according to a fourth embodiment of the present disclosure.

FIG. 4 illustrates a PLC apparatus 4 according to a fourth embodiment of the present disclosure. The PLC apparatus 4 includes: a working state acquiring unit 41, adapted to acquire the working state of the PLC apparatus; a network state acquiring unit 42, adapted to acquire the network state of the PLC apparatus; and a switching unit 43, adapted to switch the working state of the PLC apparatus in accordance with the network state and the working state of the PLC apparatus.

In the embodiment of the present disclosure, the working state of the PLC apparatus is switched in accordance with the network state and the working state of the PLC apparatus, so that the PLC apparatus is environment-protective and energy saving, thus the power consumption of the PLC apparatus is reduced, and the normal usage by the user will not be influenced. Meanwhile, the heat generated by the PLC apparatus is reduced, and the working stability and reliability are improved.

Figure 5:
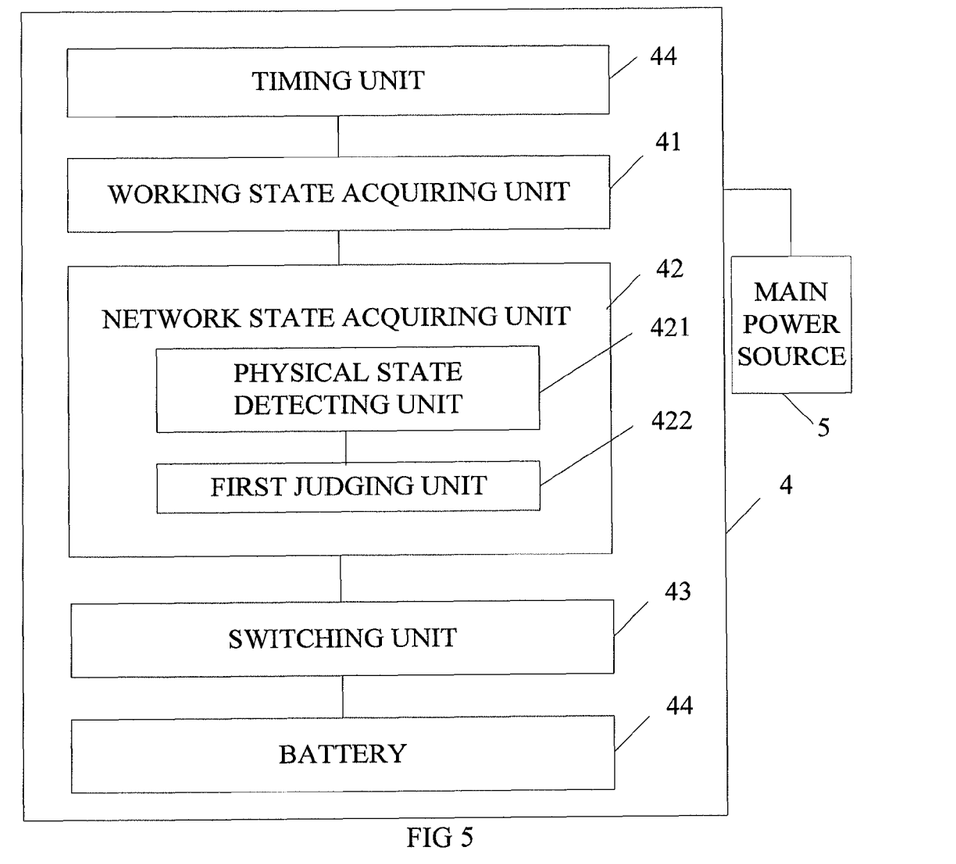
FIG. 5 is a structural diagram of a PLC apparatus according to a fifth embodiment of the present disclosure.

FIG. 5 illustrates a PLC apparatus 4 according to a fifth embodiment of the present disclosure. The PLC apparatus 4 includes:

a working state acquiring unit 41, adapted to acquire a working state of the PLC apparatus;

a network state acquire unit 42, adapted to acquire a network state of the PLC apparatus;

a switching unit 43, adapted to switch the working state of the PLC apparatus in accordance with the network state and the working state of the PLC apparatus; and a timing unit 44, adapted to start the working state acquiring unit 41 and the network state acquiring unit 42, when a predetermined time passes.

The network state acquiring unit 42 includes:

a physical state detecting unit 421, adapted to detect a state of physical connection between the PLC apparatus and the network; and a first judging unit 422, adapted to determine the acquired network state of the PLC apparatus as busy when the state of physical connection between the PLC apparatus and the network is normal, and determine the acquired network state of the PLC apparatus as idle when the state of physical connection between the PLC apparatus and the network is disconnected.

The switching unit 43 is further adapted to switch the PLC apparatus from the normal working state to a sleep state when the network state of the PLC apparatus is idle and the working state is normal, and switch the PLC apparatus from the sleep state to the normal working state when the network state of the PLC apparatus is busy and the working state is sleep.

The normal working state of the PLC apparatus is that the PLC apparatus is powered by its main power source 5, which charges a battery 44 of the PLC apparatus at the same time, and/or that a chip of the PLC apparatus is in a maximum power consumption mode. The chip of the PLC apparatus may be a power source chip in the PLC apparatus, or a network transmission chip. The sleep state of the PLC apparatus is that the PLC apparatus is powered by its battery and/or that the chip of the PLC apparatus is in a standby mode.

The switching unit 43 provides a control signal to the chip of the PLC apparatus, so that the chip of the PLC apparatus is switched between the standby mode and the maximum power consumption mode. Alternatively, the switching unit 43 provides a control signal to the relay of the PLC apparatus to control the relay to switch between the main power source and the battery.

With the PLC apparatus according to the embodiment of the present disclosure, when the PLC apparatus enters the normal working state from the sleep state, the main power source 5 of the PLC apparatus charges the battery; when the PLC apparatus enters the sleep state from the normal working state, the switching unit firstly controls the battery 44 to supply power, and then controls the relay to shut off the main power source of the PLC apparatus; and when the PLC apparatus enters the normal working state from the sleep state again, the switching unit controls the relay to switch to the main power source 5 of the PLC apparatus, and the battery 44 is again being charged.

In the above embodiment, the network state acquiring unit 42 judges the network state of the PLC apparatus in accordance with the state of physical connection between the PLC apparatus and the network, and the switching unit 43 automatically switches the working state of the PLC apparatus in accordance with the network state and the working state of the PLC apparatus so as to put the PLC apparatus into the sleep state when the network state of the PLC apparatus is idle, and put the PLC apparatus into the normal working state when the network state of the PLC apparatus is busy, thereby saving electric energy without any manual interference.

Figure 6:
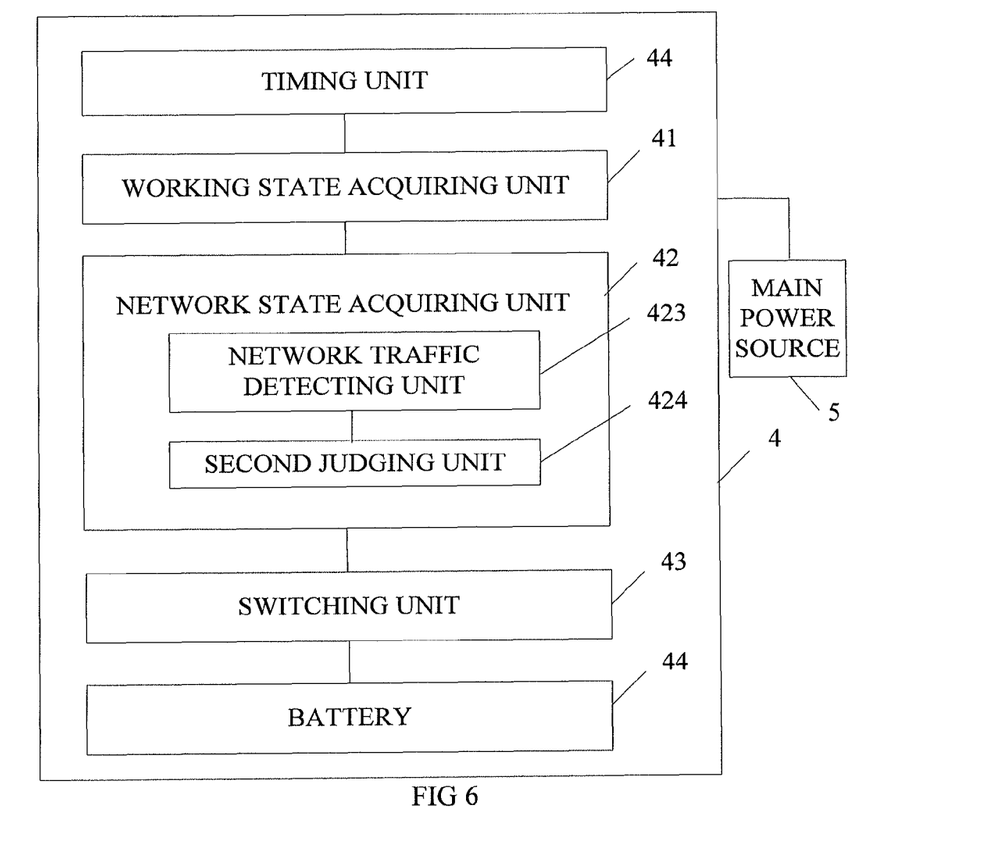
FIG. 6 is a structural diagram of a PLC apparatus according to a sixth embodiment of the present disclosure.

FIG. 6 illustrates a PLC apparatus 4 according to a sixth embodiment of the present disclosure. The PLC apparatus 4 includes:

a working state acquiring unit 41, adapted to acquire a working state of the PLC apparatus;

a network state acquiring unit 42, adapted to acquire a network state of the PLC apparatus;

a switching unit 43, adapted to switch the working state of the PLC apparatus in accordance with the network state and the working state of the PLC apparatus; and a timing unit 44, adapted to start the working state acquiring unit 41 and the network state acquiring unit 42, when a predetermined time passes.

The network state acquiring unit 42 includes:

a network traffic detecting unit 423, adapted to detect a traffic of network data passing the PLC apparatus; and a second judging unit 424, adapted to determine the acquired network state of the PLC apparatus as busy when the traffic of network data passing the PLC apparatus is larger than a predetermined value, and determine the acquired network state of the PLC apparatus as idle when the traffic of network data passing the PLC apparatus is smaller than or equal to the predetermined value.

The switching unit 43 is adapted to switch the PLC apparatus from the normal working state to a sleep state when the network state of the PLC apparatus is idle and the working state is normal, and switch the PLC apparatus from the sleep state to the normal working state when the network state of the PLC apparatus is busy and the working state is sleep.

The normal working state of the PLC apparatus is that the PLC apparatus is powered by its main power source 5, which charges a battery 44 of the PLC apparatus at the same time; and/or a chip of the PLC apparatus is in a maximum power consumption mode. The sleep state of the PLC apparatus is that the PLC apparatus is powered by its battery 44; and/or the chip of the PLC apparatus is in a standby mode.

In the above embodiment, the network state acquiring unit 42 judges the network state of the PLC apparatus in accordance with the traffic of network data passing the PLC apparatus, and the switching unit 43 automatically switches the working state of the PLC apparatus in accordance with the network state and the working state of the PLC apparatus, so as to put the PLC apparatus into the sleep state when the network state of the PLC apparatus is idle, and put the PLC apparatus into the normal working state when the network state of the PLC apparatus is busy, thereby saving electric energy without any manual interference.

A person skilled in the art can understand that all or a part of the steps of the methods according to the above embodiments can be implemented by instructing related hardware through a program. The program can be stored in a readable storage medium of a mobile terminal, and the program includes the steps of above method embodiments, when being executed.

The above description is given with regard to the preferred embodiments of the present disclosure. It is apparent to a person skilled in the art that modifications and embellishments can be made without deviating from the scope of the present disclosure, and these modifications and embellishments shall also be deemed as falling within the protection scope of the present disclosure.

What is claimed is:

1. A method for controlling a Power Line Communication, PLC, apparatus, comprising:
    acquiring a working state and a network state of the PLC apparatus;
    switching the working state of the PLC apparatus in accordance with the working state and the network state of the PLC apparatus, wherein, the switching of the working state of the PLC apparatus in accordance with the working state and the network state of the PLC apparatus comprises:
        when the network state of the PLC apparatus is idle by having the PLC apparatus ceasing from all Power Line Communication to an external network through a utility power line while the PLC apparatus stays connected electrically to the utility power line, and when the working state of the PLC apparatus is in a normal working state: switching the PLC apparatus to a sleep state to be powered only by an internal battery;
        when the network state of the PLC apparatus is busy by having the PLC apparatus resuming the Power Line Communication to the external network through determining network traffic in the utility power line, and when the working state of the PLC apparatus is in the sleep state: switching the PLC apparatus from the sleep state to the normal working state to be powered only by a main power source;
    wherein during the normal working state of the PLC apparatus:
        the main power source converts an Alternating Current (AC) from a utility power line into a working voltage required by the PLC apparatus, and the main power source charges the internal battery of the PLC apparatus at the same time, or
        a chip of the PLC apparatus is in a maximum power consumption mode and the PLC apparatus is powered by the main power source, which charges the internal battery of the PLC apparatus at the same time,
    wherein during the sleep state of the PLC apparatus:
        the main power source stays electrically connected to the utility power line, which is utilized by the PLC apparatus for resuming the Power Line communication to the external network and for resuming providing power to the PLC,
        the PLC apparatus is powered only by the internal battery; or
        the chip of the PLC apparatus is in a standby mode indicating that the PLC apparatus is being powered only by the internal battery, and the PLC apparatus stays idle while electrically connected to the external network.

2. The method according to claim 1, wherein before acquiring the working state and the network state of the PLC apparatus, the method further comprising:
    starting a timer, and acquiring the working state and the network state of the PLC apparatus when the timer times out.

3. The method according to claim 1, wherein the acquiring of the network state of the PLC apparatus comprising:
    detecting a state of physical connection between the PLC apparatus and the network, wherein the acquired network state of the PLC apparatus is detected to be busy, if the state of physical connection between the PLC apparatus and the network is normal, and the acquired network state of the PLC apparatus is detected to be idle, if the state of physical connection between the PLC apparatus and the network is disconnected; or
    detecting a traffic of network data passing the PLC apparatus, wherein the acquired network state of the PLC apparatus is detected to be busy, if the traffic of network data passing the PLC apparatus is larger than a predetermined value, and the acquired network state of the PLC apparatus is detected to be idle, if the traffic of network data passing the PLC apparatus is smaller than or equal to the predetermined value.

4. A Power Line Communication, PLC, apparatus, which comprises:
    a working state acquiring unit, adapted to acquire a working state of the PLC apparatus;
    a network state acquiring unit, adapted to acquire a network state of the PLC apparatus; and
    a switching unit, adapted to switch the working state of the PLC apparatus in accordance with the acquired network state and the acquired working state of the PLC apparatus, wherein:
        the switching unit is adapted to:
            switch the PLC apparatus to a sleep state to be powered only by an internal battery:

when the network state of the PLC apparatus is idle by having the PLC apparatus ceases from all Power Line Communication to an external network through a utility power line while the PLC apparatus stays connected electrically to the utility power line, and the working state of the PLC apparatus is in a normal working state, or switch the PLC apparatus from the sleep state to a normal working state to be powered by a main power source:

when the network state of the PLC apparatus is busy by having the PLC apparatus resuming the Power Line Communication to the external network through determining network traffic in the utility power line, and the working state of the PLC apparatus is in the sleep state;

wherein during the normal working state of the PLC apparatus:

the main power source converts an Alternating Current (AC) from a utility power line into a working voltage required by the PLC apparatus, and the main power source charges the internal battery of the PLC apparatus at the same time, or a chip of the PLC apparatus is in a maximum power consumption mode and the PLC apparatus is powered by the main power source, which charges the internal battery of the PLC apparatus at the same time wherein during the sleep state of the PLC apparatus:

the main power source stays electrically connected to the utility power line, which is utilized by the PLC apparatus for resuming the Power Line communication to the external network and for resuming providing power to the PLC, the PLC apparatus is powered only by the internal battery; or the chip of the PLC apparatus is in a standby mode indicating that the PLC apparatus is being powered only by the internal battery, and the PLC apparatus stays idle while electrically connected to the external network.

5. The PLC apparatus according to claim 4, further comprises:

a timing unit, adapted to start the working state acquiring unit and the network state acquiring unit when a predetermined time passes.

6. The PLC apparatus according to claim 4, wherein, the network state acquiring unit comprises:

a physical state detecting unit adapted to detect a state of physical connection between the PLC apparatus and the network;

a first judging unit adapted to determine the acquired network state of the PLC apparatus as busy, if the state of physical connection between the PLC apparatus and the network detected by the physical state detecting unit is normal, and to determine the acquired network state of the PLC apparatus as idle, if the state of physical connection between the PLC apparatus and the network detected by the physical state detecting unit is disconnected; or the network state acquiring unit comprises: a network traffic detecting unit adapted to detect a traffic of network data passing the PLC apparatus; and a second judging unit adapted to determine the acquired network state of the PLC apparatus as busy, if the traffic of network data passing the PLC apparatus detected by the network traffic detecting unit is larger than a predetermined value, and to determine the acquired network state of the PLC apparatus as idle, if the traffic of network data passing the PLC apparatus detected by the network traffic detecting unit is smaller than or equal to the predetermined value.

* * * * *